US012773004B2

(12) United States Patent
Besso et al.

(10) Patent No.: US 12,773,004 B2
(45) Date of Patent: Oct. 27, 2026

(54) SUSCEPTOR HEATING ELEMENT EXTRACTION

(71) Applicant: PHILIP MORRIS PRODUCTS S.A., Neuchâtel (CH)

(72) Inventors: Clement Besso, Neuchâtel (CH); Carmelo Simone Maria Parisi, Neuchâtel (CH)

(73) Assignee: Philip Morris Products S.A., Neuchâtel (CH)

(*) Notice: Subject to any disclaimer, the term of this patent is extended or adjusted under 35 U.S.C. 154(b) by 685 days.

(21) Appl. No.: 18/031,935

(22) PCT Filed: Oct. 15, 2021

(86) PCT No.: PCT/IB2021/059479
§ 371 (c)(1),
(2) Date: Apr. 14, 2023

(87) PCT Pub. No.: WO2022/079668
PCT Pub. Date: Apr. 21, 2022

(65) Prior Publication Data

US 2023/0380478 A1 Nov. 30, 2023

(30) Foreign Application Priority Data

Oct. 15, 2020 (EP) .................................... 20201985

(51) Int. Cl.
*A24C 5/18* (2006.01)
*A24C 5/36* (2006.01)
(Continued)

(52) U.S. Cl.
CPC ................ *A24C 5/185* (2013.01); *A24C 5/36* (2013.01); *A24F 13/24* (2013.01); *B09B 3/35* (2022.01)

(58) Field of Classification Search
CPC .. A24F 40/20; A24F 1/00; A24F 13/24; A24F 13/26; A24C 5/36; A24C 5/185;
(Continued)

(56) References Cited

U.S. PATENT DOCUMENTS 1,977,903 A * 10/1934 Von Wolforsdorf ...... B67B 7/32 29/DIG. 95
8,752,458 B2 * 6/2014 Cadden .................. B26B 5/005 30/294
(Continued)

FOREIGN PATENT DOCUMENTS

CN 111616418 A * 9/2020 ............. A24F 40/40
CN 109195464 B * 4/2025 ........... A24F 40/485
(Continued)

OTHER PUBLICATIONS

TW-M506024-U English translation; 2015-08-01; Fu Yao-De B26B3/03.*
(Continued)

*Primary Examiner* — Laura M Lee
(74) *Attorney, Agent, or Firm* — Mueting Raasch Group

(57) ABSTRACT

An assembly to facilitate removal of a susceptor heating element from an aerosol generating article includes a cutting tool comprising (i) a body defining a passageway through which the aerosol generating article may be passed, and (ii) a cutting element extending into the passageway. The cutting element comprises a cutting edge arranged to cut the aerosol generating article as the aerosol generating article passes through the passageway. The assembly may include a heating element removal tool comprising a tip configured to magnetically attract the susceptor heating element. Alternatively, the cutting element may comprise a magnet to attract the susceptor heating element as the aerosol generating
(Continued)

article passes the cutting element as the aerosol generating article passes through the passageway.

14 Claims, 5 Drawing Sheets

(51) Int. Cl.
*A24F 13/24* (2006.01)
*B09B 3/35* (2022.01)

(58) Field of Classification Search
CPC ... B26B 11/00–008; B26B 7/30; B26B 27/00; B26B 27/005; H02G 1/1214; H02G 1/1258; H02G 1/1263; B09B 3/35; B09B 2101/15
USPC ..... 131/194, 96, 907, 248–255; 30/103–113, 30/278, 280, 90.4–91.1
See application file for complete search history.

(56) References Cited

U.S. PATENT DOCUMENTS

| | | | | |
|---|---|---|---|---|
| 10,226,072 | B2 * | 3/2019 | Nelson | A24F 13/26 |
| 10,264,818 | B2 * | 4/2019 | Spurling, III | A24F 13/24 |
| 11,363,840 | B2 * | 6/2022 | Courbat | A24F 40/465 |
| 11,870,225 | B2 * | 1/2024 | Chandler | H02G 1/1236 |
| 12,507,735 | B2 * | 12/2025 | Wright | A24C 5/36 |
| 2001/0015209 | A1 | 8/2001 | Zielke | |
| 2003/0056306 | A1 | 3/2003 | Loth | |
| 2010/0175268 | A1 * | 7/2010 | Senesi | B26B 5/007 30/162 |
| 2013/0199549 | A1 | 8/2013 | Spurling | |
| 2023/0147341 | A1 * | 5/2023 | Wright | B09B 3/35 131/329 |
| 2024/0423268 | A1 * | 12/2024 | Park | A24F 40/40 |

FOREIGN PATENT DOCUMENTS

| | | | | | |
|---|---|---|---|---|---|
| DE | 102014215228 | A1 | | 2/2016 | |
| EP | 1125508 | A2 | | 8/2001 | |
| EP | 3114945 | A1 | * | 1/2017 | A24C 5/36 |
| KR | 20250149314 | A | * | 10/2025 | A24F 13/24 |
| TW | M506024 | U | * | 8/2015 | B26B 3/03 |
| WO | WO-9320985 | A1 | * | 10/1993 | B26D 3/08 |
| WO | WO-2019030360 | A1 | * | 2/2019 | A24F 40/465 |
| WO | WO-2025114225 | A1 | * | 6/2025 | A24C 5/36 |
| WO | WO-2026061787 | A1 | * | 3/2026 | B09B 3/40 |

OTHER PUBLICATIONS

European Search Report for EP 20201985.7 issued by the European Patent Office on Mar. 17, 2021, 7 pgs.
International Search Report and Written Opinion for PCT/IB2021/059479, issued by the European Patent Office on Nov. 30, 2021; 12 pgs.
International Preliminary Report on Patentability for PCT/IB2021/059479, issued by the European Patent Office on Oct. 11, 2022; 10 pgs.

* cited by examiner

SUSCEPTOR HEATING ELEMENT EXTRACTION

This application is the § 371 U.S. National Stage of International Application No. PCT/IB2021/059479, filed 15 Oct. 2021, which claims the benefit of European Application No. 20201985.7, filed 15 Oct. 2020, the disclosures of which are incorporated herein by reference.

The present disclosure relates to methods, tools, and assemblies for extracting a susceptor heating element from an aerosol generating article.

Some aerosol generating systems include an aerosol generating device having an inductive heating element and a cavity configured to receive an aerosol generating article. The aerosol generating article comprises an aerosol forming substrate and a susceptor heating element. The susceptor heating element is positioned such that the inductive heating element of the aerosol generating device may heat the susceptor heating element when the aerosol generating article is received in the cavity. Heating of the susceptor heating element causes heating of the aerosol forming substrate to generate an aerosol.

Removal of a susceptor heating element from an aerosol generating article may be challenging. The interior of the aerosol generating article may need to be accessed, as the susceptor heating element is typically within an interior of the aerosol generating article. In some instances, the susceptor heating element may be embedded within the aerosol forming substrate.

According to aspects of the present invention, there is provided an assembly to facilitate removal of a susceptor heating element from an aerosol generating article. The assembly comprises a cutting tool. The cutting tool comprises a body defining a passageway through which the aerosol generating article may be passed and comprises a cutting element extending into the passageway. The cutting element comprises a cutting edge arranged to cut the aerosol generating article as the aerosol generating article passes through the passageway. The assembly also comprises a heating element removal tool comprising a tip configured to magnetically attract the susceptor heating element and to remove the heating element from the aerosol generating element that has been cut by the cutting tool when the tip is placed in proximity to the susceptor heating element.

Use of the assembly may permit recovery and recycling of the susceptor heating element. In some aerosol generating articles comprising a susceptor heating element, the susceptor heating element may be the only element that is not biodegradable or may be one of a limited number of elements that are not biodegradable. Accordingly, removal and recycling of the susceptor heating element may be environmentally advantageous.

In addition, it may be advantageous to recover the susceptor heating element because susceptor material may be a valuable resource. The recycled susceptor heating element may be used in any suitable manner. For example, the recycled susceptor heating element may be reused, repurposed, or components may be recovered.

The assembly of the present invention may advantageously be arranged to permit safe cutting of the aerosol generating article. For example, the cutting edge of the cutting element may be positioned within the passageway. Such positioning may prevent accidental contact of the cutting edge of the cutting element by a user.

The heating element removal tool may be retainable relative to the passageway of the cutting tool. Such an arrangement may be convenient for a consumer. For example, when the heating element removal tool is retained relative to the passageway of the cutting tool, the space occupied by the assembly may be reduced relative to storing each tool separately. Retention of the heating element removal tool relative to the cutting tool may also allow the tools to be stored together so that both tools are available when needed by the consumer.

According to aspects of the present invention, there is provided a tool to facilitate removal of a susceptor heating element from an aerosol generating article. The tool comprises a body defining a passageway through which the aerosol generating article may be passed. The tool also comprises a cutting element extending into the passageway. The cutting element comprises a cutting edge arranged to cut the aerosol generating article as the aerosol generating article passes through the passageway. The cutting element comprises a magnet and is configured to magnetically attract the susceptor heating element.

The cutting element may be configured to be inserted into the passageway and removed from the passageway. When the cutting element is removed from the passageway and the susceptor heating element is magnetically attracted to the cutting element, the susceptor heating element may be removed from the passageway. The removed susceptor heating element may be recycled.

The tool of the present invention may advantageously be arranged to permit safe cutting of the aerosol generating article. For example, the cutting edge of the cutting element may be positioned within the passageway to cut the aerosol generating article. Such positioning may prevent accidental contact of the cutting edge of the cutting element by a user when the tool is in use.

According to aspects of the present invention, there is provided a method for removing a susceptor heating element from an aerosol generating article. The method comprises passing the aerosol generating article through a passageway of a cutting tool. The cutting tool comprises a body defining the passageway and comprises a cutting element extending into the passageway. The cutting element comprises a cutting edge arranged to cut the aerosol generating article as the aerosol generating article is passed through the passageway. The method comprises removing the susceptor heating element from the cut aerosol generating article. The removed susceptor heating element may be recycled.

The tools and assemblies of the present invention may be used to carry out the methods of the present invention.

The methods, tools, and assemblies of the present invention may be used to extract a susceptor heating element from any suitable aerosol generating article. The aerosol generating article may be of any suitable size and shape. For example, the aerosol generating article may form an elongate cylindrical rod. The aerosol generating article may comprise a mouth end and a distal end upstream of the mouth end. In use, a user may draw on the mouth end to inhale aerosol generated by the aerosol generating article. The aerosol generating article may comprise an aerosol forming substrate positioned at, or towards, the distal end.

The aerosol forming substrate may be a solid, a liquid, or may comprise solid components and liquid components. Preferably, the aerosol forming substrate comprises nicotine. In some preferred embodiments, the aerosol forming substrate comprises tobacco. For example, the aerosol forming substrate may comprise a sheet of homogenised tobacco. The aerosol forming substrate may comprise a non-tobacco containing aerosol forming material. For example, the aerosol forming material may comprise a sheet comprising a nicotine salt and an aerosol former.

The aerosol forming substrate may be in the form of a plug comprising an aerosol forming material circumscribed by a paper or other wrapper.

The aerosol generating article comprises a susceptor heating element arranged to sufficiently heat the aerosol forming substrate to generate an aerosol when the susceptor heating element is heated by an inductor of an aerosol generating device. Preferably, the susceptor heating element, the aerosol generating device, or the susceptor heating element and the aerosol generating device are configured such that the susceptor heating element sufficiently heats the aerosol forming substrate to generate an aerosol without combusting the aerosol forming substrate.

The susceptor heating element is in thermal contact with the aerosol forming substrate. The susceptor element may be in direct physical contact with the aerosol forming substrate. The susceptor heating element may be embedded in the aerosol forming substrate or may be external to the aerosol forming substrate. Preferably, the susceptor heating element is embedded in the aerosol forming substrate. When embedded in the aerosol forming substrate, the susceptor heating element may be disposed along a longitudinal axis of the aerosol forming substrate or may be offset from the longitudinal axis of the aerosol forming substrate.

The susceptor heating element may be in the form of a generally rectangular, thin, elongate member. The susceptor heating element may be sheet-like. The susceptor heating element may extend along any suitable portion of the length of the aerosol forming substrate within the article. For example, the susceptor heating element may extend along 60% or more of the length of the aerosol forming substrate in the article.

The susceptor heating element may comprise any material that may be inductively heated to a temperature sufficient to generate an aerosol from the aerosol forming substrate. For example, the susceptor heating element may comprise metal or carbon. The susceptor heating element may comprise a ferromagnetic material. The ferromagnetic material may comprise ferritic iron, a ferromagnetic steel, or stainless steel. The susceptor heating element may comprise aluminium.

The susceptor heating element may comprise a non-metallic core with a metal layer disposed on the non-metallic core. For example, the susceptor heating element may comprise metallic tracks formed on a surface of a ceramic core.

The susceptor heating element may comprise a protective external layer. For example, the susceptor heating element may comprise a protective ceramic layer or protective glass layer encapsulating the susceptor material. The susceptor heating element may comprise a protective coating formed by a glass, a ceramic, or an inert metal, formed over a core of susceptor material.

At least a portion or component of the susceptor heating element is magnetically attractable.

The aerosol generating article may contain a single susceptor heating element or may contain more than one susceptor heating element. The methods, tools, and assemblies described herein may be used to recover more than one susceptor heating element from an aerosol generating article if the aerosol generating article comprises more than one susceptor heating element.

The aerosol generating article may comprise a support element. The support element may be located downstream of the aerosol forming substrate. The support element may abut the aerosol-forming substrate. The support element may comprise a hollow tubular element. In a preferred embodiment, the support element comprises a hollow cellulose acetate tube or a cardboard tube.

The aerosol generating article may comprise an aerosol cooling element. The aerosol cooling element may be located downstream of the aerosol forming substrate. The aerosol cooling element may be located downstream of a support element. The aerosol cooling element may abut the support element. The aerosol cooling element may serve as a heat exchanger. Preferably, the aerosol cooling element has a sufficient surface area and thermal conductivity to cool heated aerosol generated from the aerosol forming substrate. Preferably, the aerosol-cooling element does not substantially affect the resistance to draw of the aerosol generating article. The aerosol cooling element may comprise a plurality of longitudinally extending channels. The aerosol cooling element may comprise polylactic acid.

The aerosol generating article may comprise a mouthpiece. The mouthpiece may be located at the mouth end of the aerosol generating article. In some preferred embodiments, the aerosol cooling element is located between the support element and the mouthpiece. The mouthpiece may comprise a filter. The filter may comprise cellulose acetate.

The aerosol generating article may comprise a housing in which the components, such as the aerosol forming substrate and susceptor heating element, the support element, the aerosol cooling element, and the mouthpiece are disposed. The housing may comprise a wrapper that circumscribes the components of the aerosol generating article. The wrapper may be formed from any suitable material. For example, the wrapper may comprise cigarette paper.

The aerosol-generating article may have any suitable total length. For example, the length of the aerosol generating article may be from 30 millimetres to 100 millimetres, preferably, between 30 millimetres and 60 millimetres.

The aerosol generating article may have any suitable external diameter. Preferably, the external diameter of the aerosol generating article is suitable for the distal end of the aerosol generating article to be received in a cavity of an electrically operated aerosol generating device. In some embodiments, the external diameter of the aerosol generating article is from 5 millimetres to 12 millimetres, preferably, between 6 millimetres and 8 millimetres.

The cutting tools of the present invention comprise a body defining a passageway through which an aerosol generating article may be passed. For example, the inner diameter of the cutting tool defined by the passageway may be larger than the outer diameter of the aerosol generating article. Preferably, the inner diameter of cutting tool is not substantially larger than the outer diameter of the aerosol generating article. For example, the inner diameter of the cutting tool may be less than 5 millimetres larger than the outer diameter of the aerosol generating article or less than 2 millimetres larger than the outer diameter of the aerosol generating article, or less than 1 millimetre larger than the outer diameter of the aerosol generating article, or less than 0.5 millimetres larger than the outer diameter of the aerosol generating article. In some preferred embodiments, the inner diameter defined by the passageway of the cutting tool is from 5 millimetres to 15 millimetres, such as from 7 millimetres to 10 millimetres.

The inner diameter defined by the passageway of the cutting tool may be uniform or may vary along its length. Preferably, the inner diameter defined by the passageway of the cutting tool is uniform or substantially uniform over 50 percent or more of the length of the passageway, such as over 80 percent or more of the length of the passageway. For example, the inner diameter defined by the passageway of the cutting tool may be considered substantially uniform if it varies by 10 percent or less along its length or by 5 percent or less along its length. By having a substantially uniform inner diameter, the passageway may create stability for cutting an aerosol generating article that passes through the passageway, particularly if the inner diameter of the passageway is similar to the outer diameter of the aerosol generating article.

The cutting tool may comprise an inlet funnel having an opening in communication with the passageway. For example, the inlet funnel may form a chamfered inlet to the passageway. The chamfered inlet may aid in guiding the aerosol generating article into the passageway. The cutting tool may comprise more than one inlet funnel. For example, the cutting tool may comprise an inlet funnel in communication with each end of the passageway.

The passageway of the cutting tool may have any suitable length. Preferably, the passageway has a length shorter than the length of the aerosol generating article. Preferably, the length of the passageway permits the aerosol generating article to be pushed into the passageway from one end and to be pulled from the passageway from an opposing end. For example, the passageway may have a length of less than 80 percent of the length of the aerosol generating article, such as less than 50 percent of the length of the aerosol generating article or less than 20 percent of the aerosol generating article.

The aerosol generating article for use with the cutting tool may have a length that is 1 centimetre or more greater than the passageway of the cutting tool. For example, the aerosol generating article may have a length that is 2 centimetres or more greater than the passageway, 3 centimetres or more greater than the passageway, 10 centimetres or more greater than the passageway, or 20 centimetres or more greater than the length of the passageway.

The length of the passageway of the cutting tool may be greater than the length of the susceptor heating element. Alternatively, the length of the passageway may be less than the length of the susceptor heating element.

In some preferred embodiments, the cutting tool has a length from 20 millimetres to 50 millimetres.

The body of the cutting tool may have any suitable thickness. In some preferred embodiments, the body of the cutting tool has a thickness from 2 millimetres to 20 millimetres, such as from 4 millimetres to 10 millimetres.

The body of the cutting tool may be made from any suitable material or combination of materials. For example, the body of the cutting tool may be made from one or more of a metal and a plastic material, such as a hard plastic material. For example, the body of the cutting tool may be made from polycarbonate, polyetheretherketone, high density polyethylene, polypropylene, polyvinyl chloride, acrylonitrile butadiene styrene, stainless steel, aluminium or an aluminium alloy, iron or an iron alloy, and the like, and combinations thereof. In some embodiments, the body of the cutting tool comprises a magnetic material. For example, the body may comprise a ferromagnetic material, a rare earth magnetic material, or a ferromagnetic material and a rare earth magnetic material. The entire body may be ferromagnetic or one or more portions of the body may be ferromagnetic.

The cutting tool comprises a cutting element that extends into the passageway. The cutting element comprises a cutting edge that is arranged to cut the aerosol generating article as the aerosol generating article passes through the passageway. The cutting tool may comprise any suitable cutting element.

The cutting element may comprise a blade, a wire, or any other structure having an edge suitable to cut the aerosol generating article as the article passes through the passageway. A blade may have a sharpened cutting edge to cut the aerosol generating article. A blade may be made from any suitable material or materials. For example, the blade may be made from one or more of a metal and a plastic material, such as a hard plastic material. For example, the blade may comprise one or more of polycarbonate, polyetheretherketone, high density polyethylene, polypropylene, polyvinyl chloride, acrylonitrile butadiene styrene, stainless steel, aluminium or an aluminium alloy, iron or an iron alloy, titanium or a titanium alloy, obsidian, a ceramic, and the like.

The blade may extend into the passageway a distance sufficient to cut the aerosol generating article as the aerosol generating article passes through the passageway. The blade may extend entirely across the passageway or may extend partially across the passageway. For example, the blade may extend into the passageway a distance equal to 20 percent to 100 percent of the diameter of the passageway. In some preferred embodiments, the cutting edge of the blade extends into the passageway a distance equal to 30 percent to 50 percent of the diameter of the passageway.

A wire may be sufficiently thin to cut the aerosol generating article. Preferably, the wire extends across the passageway and is secured relative to two locations of the passageway. The locations of the passageway to which the wire is secured may be opposing locations of the passageway or may be non-opposing locations of the passageway. Securing the wire relative to non-opposing locations of the passage may permit the wire to cut the aerosol generating article off centre. Cutting the aerosol generating article off centre may aid in ensuring that the wire does not cut through or contact the susceptor heating element as the aerosol generating article is passed through the passageway of the cutting tool.

The cutting tool may comprise a wire formed from any suitable material or materials. For example, the wire may be made from one or more of a metal and a plastic material, such as a hard plastic material. For example, the blade may be made from polycarbonate, polyetheretherketone, high density polyethylene, polypropylene, polyvinyl chloride, acrylonitrile butadiene styrene, stainless steel, aluminium or an aluminium alloy, iron or an iron alloy, titanium or a titanium alloy, carbon, a ceramic, and the like, and combinations thereof. The wire may be in the form of a filament, a braided wire, a stranded wire, a braided stranded wire, or the like.

The cutting element may extend through or towards the geometric centre of the passageway or may be offset from the geometric centre of the passageway. For example, the cutting edge may be offset from the geometric centre of the passageway by a distance in a range from 10 percent to 20 percent of the diameter of the passageway. Cutting the aerosol generating article off centre may aid in ensuring that the cutting element does not cut through or contact the susceptor heating element, or other portions or components of the aerosol generating article, as the aerosol generating article is passed through the passageway of the cutting tool.

The cutting element may comprise one or more cutting edges. For example, the cutting element may comprise a first cutting edge positioned and arranged to cut an aerosol generating article as it is passed through the passageway from a first end to a second end and may comprise a second cutting edge positioned and arranged to cut an aerosol generating article as it is passed through the passageway from a second end to a first end. The first edge may face the first opening. The second end may face the second opening. With such an arrangement, the cutting tool may be used to cut the aerosol generating article regardless of the direction through which the aerosol generating article is passed through the passageway.

The cutting tool may comprise more than one cutting elements. Each cutting element may extend into to the passageway. Each cutting element may comprise a cutting edge arranged to cut the aerosol-generating article as the aerosol-generating article passes through the passageway. The cutting elements may be circumferentially spaced about the passageway. The cutting elements may be evenly spaced from one another or may be unevenly spaced from one another.

The cutting elements may be longitudinally offset in the passageway.

The cutting elements may be longitudinally offset and circumferentially offset in the passageway. Such an arrangement may permit initiation of a second cut in the aerosol generating article at a different angle of the aerosol generating article a later stage as the aerosol generating article is passed through the passageway.

The cutting tool may comprise more than one cutting element where each cutting element comprises a blade. The blades may be circumferentially spaced about the passageway with each blade extending into the passageway. The blades may be evenly spaced from one another or may be unevenly spaced from one another.

The blades may be longitudinally offset in the passageway. The blades may be longitudinally offset and circumferentially offset in the passageway.

The cutting tool may comprise more than one cutting element where each cutting element comprises a wire. The cutting tool may comprise more than one cutting element where at least one cutting element comprises a blade and at least one cutting element comprises a wire.

The cutting tool may comprise a cutting element comprising a magnet configured to magnetically attract the susceptor heating element. As the aerosol generating article is passed through the passageway of the cutting tool, the cutting edge of the cutting element cuts the aerosol generating article. When the susceptor heating element passes in proximity to the magnet of the cutting element, the magnet may attract and retain the susceptor heating element.

The cutting element, or a portion of the cutting element, may be insertable into the passageway and removable from the passageway. When inserted into the passageway, the cutting element is arranged to cut the aerosol generating article as the aerosol generating article is passed through the passageway. When removed from the passageway, the cutting element is configured to cause the removal of the magnetically attracted susceptor heating element.

In some preferred embodiments, the cutting element comprises a blade and a magnet. For example, the magnet may be positioned at a side of the blade. As the aerosol generating article passes the blade, a cutting edge of the blade cuts the aerosol generating article. As the susceptor heating element passes the cutting edge of the blade, the susceptor heating element is magnetically attracted to the magnet positioned at the side of the blade. The blade may comprise a magnetic material. The blade may comprise a magnetizable material.

The body of the cutting tool may comprise a slot configured to receive the cutting element such that the cutting edge is arranged to cut the aerosol-generating article as the aerosol generating article passes through the passageway when the cutting element is received in the slot. The cutting element may be removable from the slot. If the susceptor heating element is magnetically attracted, and retained by, the cutting element after the aerosol generating article has passed through the passageway of the cutting tool, removal of the cutting element from the slot may cause removal of the susceptor heating element.

The cutting tool may be configured such that the cutting element is capable of magnetically attracting susceptor heating elements from more than one aerosol generating article prior to removing the cutting element and the multiple magnetically attracted susceptor heating elements. For example, the cutting tool may be configured such that the cutting element may retain a first susceptor heating element from a first aerosol generating article that has passed through the passageway off the cutting tool, while cutting a second aerosol generating article and retaining a second susceptor heating element as the second aerosol generating article is passed through the passageway.

The cutting tool may comprise more than one cutting element comprising a magnet or magnetizable material, where the cutting elements are circumferentially offset. The cutting tool may be oriented such that passage of a first aerosol generating article through the passageway causes a susceptor heating element from the first aerosol generating article to be attracted to a first cutting element. The cutting tool may then be oriented such that passage of a second aerosol generating article through the passageway causes a susceptor heating element from the second aerosol generating article to be attracted to a second cutting element.

When the cutting element comprises a magnetic or magnetizable material and is removable from the cutting tool to cause removal of a magnetically attracted susceptor heating element, the length of the passageway may be greater than the length of the susceptor heating element that the cutting tool is configured to remove. A passageway having a length greater than the susceptor heating element may serve to retain the susceptor heating element in the passageway to avoid accidental contact with the susceptor heating element by the user. Alternatively, the passageway may be shorter than the length of the susceptor heating element. Having a passageway shorter than the susceptor heating element may facilitate removal of the susceptor heating element from the cutting tool without having to remove the cutting element from the cutting tool.

The cutting element may comprise any suitable magnet or magnetizable material. For example, the cutting element may comprise a ferromagnet or a rare earth magnet. Preferably, the cutting element comprises a rare earth magnet. Examples of suitable rare earth magnets include neodymium magnets and samarium magnets.

The cutting tool may comprise an alignment indicator that may be aligned with an indicator on the aerosol generating article. The indicator on the aerosol generating article may be positioned relative to the susceptor heating element. Alignment of the indicator on the aerosol generating article with the alignment indicator of the cutting tool may orient the aerosol generating article relative to the cutting element such that the cutting element avoids the susceptor heating element as the aerosol generating article is passed through the passageway of the cutting tool. Depending on the type of susceptor heating element, the cutting element may not be capable of cutting through the susceptor heating element. Accordingly, orienting the aerosol generating article relative to the cutting tool in a manner that avoids contact between the susceptor heating element and the cutting element may permit free passage of the aerosol generating article through the passageway of the cutting tool. Such an arrangement may also reduce deterioration of the blade.

If the cutting element comprises a magnet or magnetizable material, alignment of the indicator on the aerosol generating article with the alignment indicator of the cutting tool may orient the aerosol generating article relative to the cutting element such that the magnet or magnetizable material of the cutting element is placed in sufficiently close proximity to the susceptor heating element to cause the magnet or magnetizable material to attract and retain the susceptor heating element as the aerosol generating article is passed through the passageway.

The cutting tool may comprise any suitable alignment indicator. The indicator may comprise an embossed marking, a debossed marking, a coloured marking, or the like.

The present invention includes an assembly comprising the cutting tool and a heating element removal tool. The heating element removal tool comprises a magnet to attract the susceptor heating element. For example, the heating element removal tool may comprise a tip configured to magnetically attract the susceptor heating element. The tip of the heating element removal tool may be placed in proximity to the susceptor heating element after the aerosol generating article is cut and optionally separated. Magnetic attraction between the tip of the heating element removal tool and the susceptor heating element may cause the tip to engage the susceptor heating element to facilitate removal of the susceptor heating element from the cut aerosol generating article.

The tip of the heating element may comprise any suitable magnetic material. For example, the tip may comprise a ferromagnetic material, a rare earth magnetic material, or a ferromagnetic material and a rare earth magnetic material. Preferably, the tip comprises a rare earth magnetic material. Examples of suitable rare earth magnetic materials include neodymium magnets and samarium magnets.

The tip of the heating element removal tool may be any suitable shape. Preferably, the tip is conical. A conical magnet may provide for an enhanced magnetic field gradient focused at the tip of the conical portion.

The tip of the heating element removal tool may be insertable and removable from the passageway of the cutting tool. Accordingly, the tip may have a diameter less than the diameter of the passageway.

The heating element removal tool may be retainable in the passageway. For example, the tip of the heating element removal tool may be inserted into the passageway and at least a portion of the heating element removal tool may be retained in the passageway. The heating element removal tool may be retained in the passageway in any suitable manner. For example, the tip of the heating element removal tool may be magnetically attracted to the cutting element or a portion of the body of the cutting tool. The magnetic attraction may retain the heating element removal tool in the passageway until sufficient force to overcome the magnetic attraction is applied to remove the heating element removal tool, or a portion of the heating element removal tool, from the passageway. In addition or alternatively, the cutting tool may comprise a magnet that magnetically attracts a portion of the heating element removal tool. For example, a portion of the body of the cutting tool defining the passageway may comprise a magnet. In addition or alternatively, the heating element removal tool may be retained in the passageway via interference fit, threaded engagement, snap fit, or the like.

Retention of at least a portion of the heating element removal tool in the passageway of the cutting tool provides for more compact storage of the cutting tool and the heating element removal tool and may prevent separation of the tools so that both tools are available to a user when needed.

The heating element removal tool may comprise an end distal to the magnetic tip. The distal end, or a portion of the heating element removal tool between the distal end and the magnetic tip, preferably has an outer diameter greater than the diameter of the passageway of the cutting tool. The portion of the heating element removal tool having a diameter greater than the diameter of the passageway preferably abuts the body of the cutting tool adjacent an opening of the passageway. Preferably, the outer shape and size of the portion of the heating element removal tool that abuts the body of the cutting tool adjacent an opening of the passageway is the same or substantially the same as the outer shape and size of the body the cutting tool. Such matched shapes and sizes may reduce the likelihood of accidental separation of the heating element removal tool and the cutting tool due to a substantially continuous outer surface formed between the two tools.

The assembly comprising the heating element removal tool and the cutting tool may further comprise a separator tool. The separator tool may be configured to aid in separating a portion of the cut aerosol generating article from an opposing portion of the cut aerosol generating article along the cut. Separation of the opposing portions of the aerosol generating article may provide better access to the susceptor heating element, which may facilitate removal of the susceptor heating element with the heating element removal tool.

The separator tool may comprise a spreader. The separator tool may comprise a first arm having a free end and a second arm having a free end. The tool may be configured such that application of an inward force, such as a pinching force, to a mid-section of the first and second arms causes the free ends of the first and second arms to separate. For example, the separator tool may comprise a devaricator.

The separator tool or a portion of the separator tool is preferably insertable and removable from the passageway of the cutting tool. The separator tool may be retainable in the passageway. For example, an end of the separator tool may be inserted into the passageway and at least a portion of the separator tool may be retained in the passageway. The separator tool may be retained in the passageway in any suitable manner. For example, an end of the separator tool configured to be inserted into the passageway of the cutting tool may be magnetically attracted to the cutting element or a portion of the body of the cutting tool. The magnetic attraction may retain the separator tool in the passageway until sufficient force to overcome the magnetic attraction is applied to remove the separator tool, or a portion of the separator tool, from the passageway. In addition or alternatively, the cutting tool may comprise a magnet that magnetically attracts a portion of the separator tool. For example, a portion of the body of the cutting tool defining the passageway may comprise a magnet. In addition or alternatively, the separator tool may be retained in the passageway via interference fit, threaded engagement, snap fit, or the like.

Retention of at least a portion of the separator tool in the passageway of the cutting tool provides for compact storage of the cutting tool and the separator tool and may prevent separation of the tools so that both tools are available to a user when needed.

The separator tool may comprise an end distal to the end configured to be inserted into the passageway. The distal end, or a portion of the separator tool between the distal end and the end configured to be inserted into the passageway, preferably has an outer diameter greater than the diameter of the passageway of the cutting tool. The portion of the separator tool having a diameter greater than the diameter of the passageway preferably abuts the body of the cutting tool adjacent an opening of the passageway. Preferably, the outer shape and size of the portion of the separator tool that abuts the body of the cutting tool adjacent an opening of the passageway is the same or substantially the same as the outer shape and size of the body the cutting tool. Such matched shapes and sizes may provide for a sleek appearance and may reduce the likelihood of accidental separation of the separator tool and the cutting tool due to a substantially continuous outer surface formed between the two tools.

In some preferred embodiments, the separator tool is configured to be inserted into the passageway through an first opening defined by the body of the cutting tool and the heating element removal tool is configured to be inserted into the passageway through a second opening defined by the body of the cutting tool. Preferably, the separator tool and the heating element removal tool are retainable within the passageway.

The tools and assemblies of the present invention may be used in any suitable manner to remove a susceptor heating element from an aerosol generating article.

As used herein, the singular forms "a," "an," and "the" also encompass embodiments having plural referents, unless the content clearly dictates otherwise.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure, including the claims.

As used herein, the term "aerosol forming substrate" means a substrate capable of releasing, upon heating, volatile compounds, which may form an aerosol. The aerosol generated from aerosol-forming substrates of aerosol-generating articles described herein may be visible or invisible and may include vapours (for example, fine particles of substances, which are in a gaseous state, that are ordinarily liquid or solid at room temperature) as well as gases and liquid droplets of condensed vapours.

As used herein, the terms "upstream" and "downstream" describe the relative positions of elements, or portions of elements, of the aerosol generating article in relation to the direction of air flow through the aerosol generating article when a user draws on the mouth end of the aerosol generating article.

As used herein, the term "susceptor" refers to a material that can convert electromagnetic energy into heat. When located within a fluctuating electromagnetic field, eddy currents induced in the susceptor cause heating of the susceptor.

As used herein, the "longitudinal" means a direction along a length of a referenced article or tool. The term 'transverse' is used to describe the direction perpendicular to the longitudinal direction.

As used herein, "diameter" is the maximum dimension in a transverse direction of the reference article or tool.

Below there is provided a non-exhaustive list of non-limiting examples. Any one or more of the features of these examples may be combined with any one or more features of another example, embodiment, or aspect described herein.

Example Ex1: An assembly to facilitate removal of a susceptor heating element from an aerosol generating article, the assembly comprising: a cutting tool comprising (i) a body defining a passageway through which the aerosol generating article may be passed, and (ii) a cutting element extending into the passageway, wherein the cutting element comprises a cutting edge arranged to cut the aerosol generating article as the aerosol generating article passes through the passageway; and a heating element removal tool comprising a tip configured to magnetically attract the susceptor heating element.

Example Ex2: An assembly according to Example Ex1, wherein the cutting element comprises a first blade.

Example Ex3: An assembly according to Example Ex2, wherein the cutting tool comprises one or more blades in addition the first blade, each of the blades extending into the passageway and arranged to cut the aerosol generating article as the aerosol generating article passes through the passageway.

Example Ex4: An assembly according to Example Ex3, wherein the blades are circumferentially spaced about the passageway.

Example Ex5: An assembly according to Example Ex3 or Ex4, wherein the blades are evenly spaced from one another.

Example Ex6: An assembly according to Example Ex3 or Ex4, wherein the blades are unevenly spaced from one another.

Example Ex7: An assembly according to Example Ex 1, wherein the cutting element comprises a wire.

Example Ex8: An assembly according to Example Ex7, wherein the wire extends across the passageway.

Example Ex9: An assembly according to Example Ex8, wherein the wire extends through the geometric centre of the passageway.

Example Ex10: An assembly according to Example Ex8, wherein the wire is offset from the geometric centre of the passageway.

Example Ex11: An assembly according to Example Ex10, wherein the wire is offset from the geometric centre of the passageway in a range from 10 percent to 20 percent of the diameter of the passageway.

Example Ex12: An assembly according to Example Ex1, wherein the cutting tool comprises more than one cutting element, each cutting element extending into to the passageway, and each cutting element comprising a cutting edge arranged to cut the aerosol-generating article as the aerosol-generating article passes through the passageway.

Example Ex13: An assembly according to any one of Examples Ex1 to Ex12, wherein the cutting tool comprises an alignment indicator configured to align with an indicator on the aerosol generating article.

Example Ex14: An assembly according to any one of Examples Ex1 to Ex 13, wherein the tip of the heating element removal tool is insertable into the passageway.

Example Ex15: An assembly according to Example Ex14, wherein the heating element removal tool is retainable in the passageway.

Example Ex16: An assembly according to Example Ex15, wherein the heating element removal tool is magnetically retainable in the passageway.

Example Ex17: An assembly according to Example Ex16, wherein the tip of the heating element removal tool is magnetically attracted to the cutting element to magnetically retain the heating element removal tool in the passageway.

Example Ex18: An assembly according to Example Ex16, wherein the cutting tool comprises a magnet disposed about at least a portion of the passageway, wherein the heating element removal tool is attracted to the magnet to magnetically retain the heating element removal tool in the passageway.

Example Ex19: An assembly according to Example Ex18, wherein the body defining the passageway comprises the magnet.

Example Ex20: An assembly according to Example Ex15, wherein the heating element removal tool is retainable in the passageway via interference fit, threaded engagement, or snap fit.

Example Ex21: An assembly according to any one of Examples Ex1 to Ex20, comprising a separator tool configured to aid in separating a portion of the cut aerosol generating article from an opposing portion of the cut aerosol generating article along the cut.

Example Ex22: An assembly according to Example Ex21, wherein the separator tool comprises a spreader.

Example Ex23: An assembly according to Example Ex21 or Ex22, wherein at least a portion of the separator tool is configured to insert into the passageway.

Example Ex24: An assembly according to any one of Examples Ex21 to Ex23, wherein the separator tool is retainable in the passageway.

Example Ex25: An assembly according to Example Ex24, wherein the separator tool is magnetically retainable in the passageway.

Example Ex26: An assembly according to Example Ex25, wherein a portion of the separator tool is magnetically attracted to the blade to magnetically retain the separator tool in the passageway.

Example Ex27: An assembly according to Example Ex25, wherein the separator tool is configured to be magnetically retained in the passageway via magnetic attraction to the tip of the heating element removal tool.

Example Ex28: An assembly according to Example Ex25, wherein the cutting tool comprises a magnet disposed about at least a portion of the passageway, wherein the separator tool is attracted to the magnet to magnetically retain the separator tool in the passageway.

Example Ex29: An assembly according to Example Ex28, wherein the body defining the passageway comprises the magnet.

Example Ex30: An assembly according to Example Ex24, wherein the separator tool is retainable in the passageway via interference fit, threaded engagement, or snap fit.

Example Ex31: Use of an assembly according to any one of Examples Ex1 to Ex30 to remove the susceptor heating element from the aerosol-generating article.

Example Ex32: A tool to facilitate removal of a susceptor heating element from an aerosol generating article, the tool comprising: a body defining a passageway through which the aerosol generating article may be passed; and a cutting element extending into the passageway, wherein the cutting element comprising a cutting edge arranged to cut the aerosol generating article as the aerosol generating article passes through the passageway, and wherein the cutting element comprises a magnet and is configured to magnetically attract the susceptor heating element.

Example Ex33: A tool according to Example Ex32, wherein the cutting element comprises a blade.

Example Ex34: A tool according to Example Ex32 or Ex33, wherein the cutting element is configured to be inserted into the passageway and removed from the passageway.

Example Ex35: A tool according to Example Ex34, wherein the body defines a slot configured to receive the cutting element such that the cutting edge is arranged to cut the aerosol-generating article as the aerosol generating article passes through the passageway when the cutting element is received in the slot.

Example Ex36: A tool according to Example Ex35, wherein the cutting element is removable from the slot such that removal of the cutting element causes removal of the susceptor heating element when the susceptor heating element is magnetically attracted to the cutting element.

Example Ex37: Use of a tool according to any one of Examples Ex32 to Ex36 to remove the susceptor heating element from the aerosol generating article.

Example Ex38: A method for removing a susceptor heating element from an aerosol generating article, the method comprising: passing the aerosol generating article through a passageway of a cutting tool, the cutting tool comprising (i) a body defining the passageway and (ii) a cutting element extending into the passageway, the cutting element comprising a cutting edge arranged to cut the aerosol generating article as the aerosol generating article is passed through the passageway; and removing the susceptor heating element from the cut aerosol generating article.

Example Ex39: A method according to Example Ex38, wherein removing the susceptor heating element from the cut aerosol generating article comprises magnetically attracting the susceptor heating element to a tip of a heating element removal tool.

Example Ex40: A method according to Example Ex39, comprising separating a portion of the cut aerosol generating article from an opposing portion of the cut aerosol generating article along the cut.

Example Ex41: A method according to Example Ex38, wherein removing the susceptor heating element from the cut aerosol generating article comprises magnetically attracting the susceptor heating element to the cutting element.

Example Ex42: A method according to Example Ex41, further comprising withdrawing the cutting element and magnetically attracted susceptor heating element from the passageway.

Example Ex43: A method according to any one of Examples Ex38 to Ex42, comprising disposing the susceptor heating element in a recycle bin.

Example Ex44: A kit comprising an assembly according to any one of Examples Ex1 to Ex 32 or a tool according to any one of Examples Ex32 to Ex36 and comprising an aerosol generating article configured to be passed through the passageway.

Example Ex45: A kit according to Example Ex44, wherein the passageway has a length of less than 80 percent of a length of the aerosol generating article.

Example Ex46: A kit according to Example Ex44, wherein the passageway has a length of less than 50 percent of the length of the aerosol generating article.

Example Ex47: A kit according to Example Ex44, wherein the passageway has a length of less than 20 percent of the aerosol generating article.

Example Ex48: A kit according to Example Ex44, wherein the aerosol generating article has a length that is 1 centimetre or more greater than a length of the passageway.

Example Ex49: A kit according to Example Ex44, wherein the aerosol generating article has a length is 2 centimetres or more greater than the passageway.

Example Ex50: A kit according to Example Ex44, wherein the aerosol generating article has a length 3 centimetres or more greater than the passageway.

Example Ex51: A kit according to Example Ex44, wherein the aerosol generating article has a length that is 10 centimetres or more greater than the passageway.

Example Ex52: A kit according to Example Ex44, wherein the aerosol generating article has a length that is 20 centimetres or more greater than the length of the passageway.

Example Ex53: An assembly, tool, use, method or kit according to any one of Examples Ex1 to Ex 52, wherein the aerosol generating article comprises an aerosol forming substrate, and wherein the susceptor heating element extends along 60% or more of the length of the aerosol forming substrate in the aerosol generating article.

An assembly, tool, use, method or kit according to any one of Examples Ex1 to Ex 53, wherein the susceptor heating element is in the form of a generally rectangular, thin, elongate member.

Examples will now be further described with reference to the figures in which.

Figure 1:
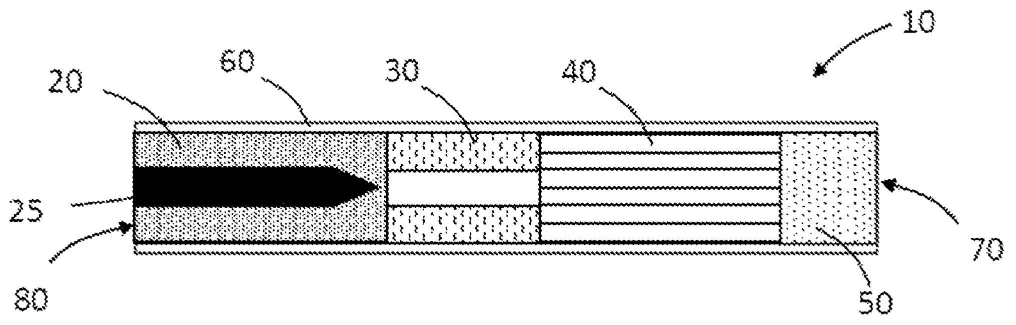
FIG. 1 is schematic cross-sectional illustration of an example of an aerosol generating article.

FIG. 1 illustrates an example of an aerosol generating article 10 that may be used with the tools, assemblies, uses, and methods of the present invention. The illustrated aerosol generating article 10 comprises four elements arranged in coaxial alignment: an aerosol forming substrate a support element 30, an aerosol cooling element 40, and a mouthpiece 50. Each of these four elements is a substantially cylindrical element, each having substantially the same diameter. These four elements are arranged sequentially and are circumscribed by an outer wrapper 60 to form a cylindrical rod. A blade shaped susceptor heating element 25 is located within, and in direct physical contact with, the aerosol forming substrate 20. The susceptor heating element 25 has a length that is approximately the same as the length of the aerosol forming substrate 20 and is located along a longitudinal axis of the aerosol generating article 10.

The susceptor heating element 25 is a ferritic iron material having a length of 12 millimeters, a width of 4 millimeters and a thickness of 1 millimeter. An end of the susceptor heating element is pointed to facilitate insertion into the aerosol forming substrate 20.

The aerosol generating article 10 has a proximal or mouth end 70, which a user inserts into his or her mouth during use, and a distal end 80 located at the opposite end of the aerosol generating article 10 to the mouth end 70. Once assembled, the total length of the aerosol generating article 10 is about 45 millimeters and the diameter is about 7.2 millimeters.

Figure 2:
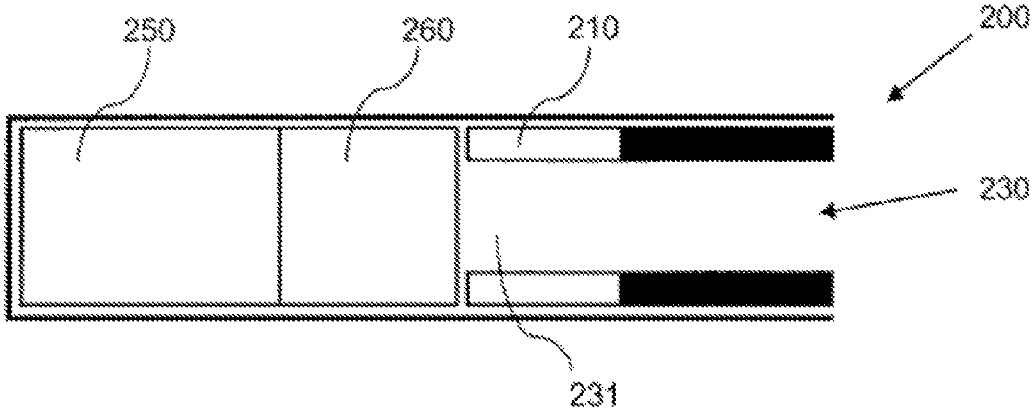
FIG. 2 is schematic cross-sectional illustration of an example of an electrically operated aerosol generating device for use with the aerosol generating article illustrate in FIG. 1.

A schematic cross-sectional illustration of an electrically operated aerosol generating device 200 is shown in FIG. 2. The aerosol generating device 200 comprises an inductor 210 located adjacent a distal portion 231 of a substrate receiving cavity 230. In use, the user inserts an aerosol generating article 10 into the substrate receiving cavity 230 of the aerosol generating device 200 such that the aerosol forming substrate 20 and susceptor heating element 25 of the aerosol generating article 10 is located adjacent to the inductor 210.

The aerosol generating device 200 comprises a battery 250 and electronics 260 that allow the inductor 210 to be actuated. Such actuation may be manually operated or may occur automatically in response to a user drawing on an aerosol generating article 10 inserted into the substrate receiving chamber 230 of the aerosol generating device 200.

Figure 3:
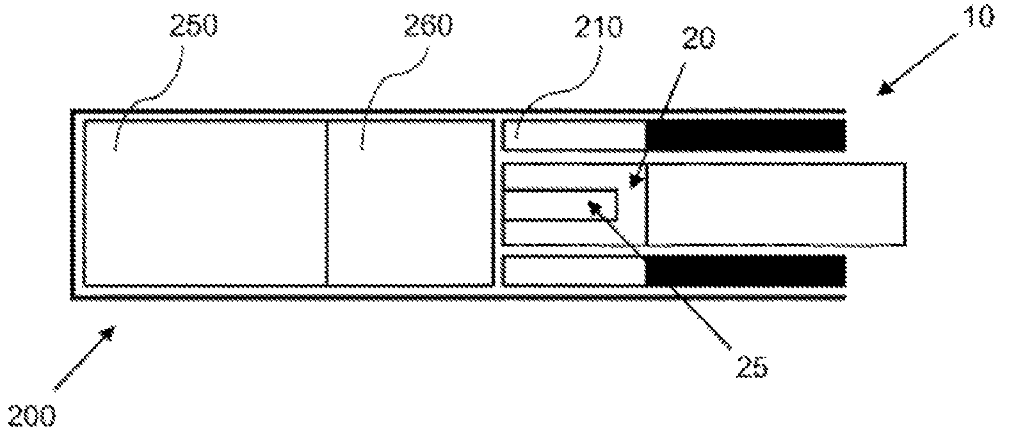
FIG. 3 is a schematic cross-sectional illustration of the aerosol generating article illustrated in FIG. 1 received in a cavity of the aerosol generating device illustrated in FIG. 2.

When actuated, a high-frequency alternating current is passed through coils of wire that form part of the inductor 210, which causes the inductor 210 to generate a fluctuating electromagnetic field within the distal portion 231 of the substrate receiving cavity 230. When an aerosol generating article 10 is correctly located in the substrate receiving cavity 230, the susceptor heating element 25 of the article 10 is located within this fluctuating electromagnetic field. The fluctuating field generates eddy currents within susceptor material of the susceptor heating element 25, which is heated as a result. The heated susceptor heating element heats the aerosol forming substrate 20 of the aerosol generating article 10 to a sufficient temperature to form an aerosol. The aerosol is drawn downstream through the aerosol generating article 10 and inhaled by the user. FIG. 3 illustrates an aerosol-generating article 10 received in the cavity 230 of the aerosol generating device 200.

Figure 4:
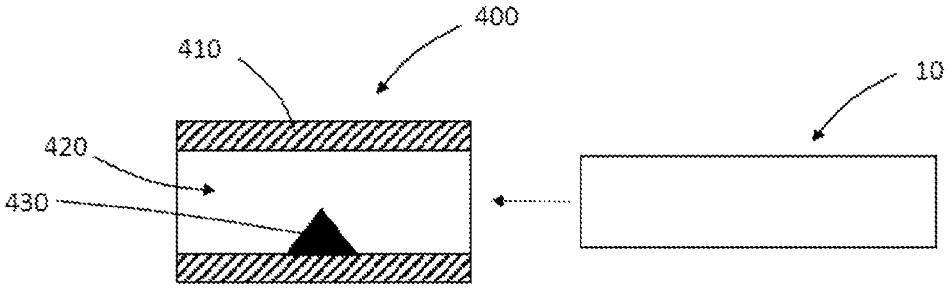
FIG. 4 is schematic cross-sectional illustration of an example of a cutting tool and an aerosol generating article that may be cut by the cutting tool.

FIG. 4 illustrates an aerosol generating article 10 and a cutting tool 400. The cutting tool 400 has a body 410 that defines a passageway 420 extending the length of the cutting tool 400. The cutting tool 400 comprises a blade 430 extending from the body 410 into the passageway 420. The depicted cutting tool 400 includes two cutting edges. One cutting edge faces an opening defined by the body 410 on the right of FIG. 4 and the other cutting edge faces an opening defined by the body 410 on the left of FIG. 4.

The aerosol generating article 10 may be passed through the passageway 420 of the cutting tool 400 from right to left. However, because the blade 430 has opposing cutting edges, the aerosol generating article 10 may also be passed through the passageway 420 from left to right. The diameter of the passageway 420 is greater than the outer diameter of the aerosol generating article 10 to allow the aerosol generating article 10 to pass through the passageway 420. The diameter of the passageway 420 may be 8 millimeters, and the diameter of the aerosol generating article 10 may be 7.2 millimeters.

After passing through the cutting tool 400 the aerosol generating article 10 is cut.

Figure 5:
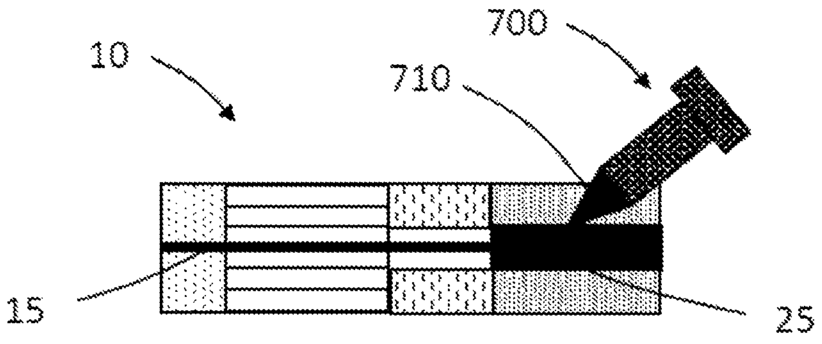
FIG. 5 is an illustration of a cross-sectional view of a cut aerosol generating article and a heating element removal tool.
Figure 6:
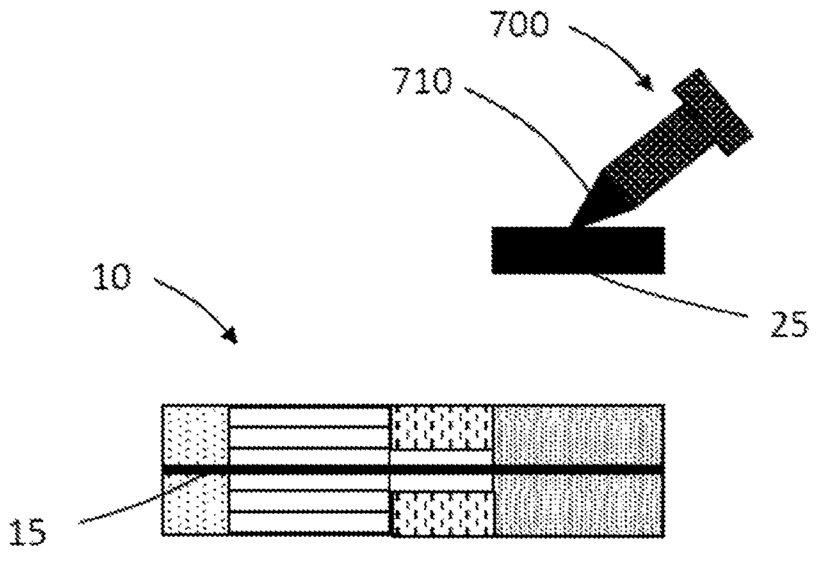
FIG. 6 is an illustration of a cross-sectional view of a cut aerosol generating article and a heating element removal tool to which a removed susceptor heating element is attracted.

FIG. 5 illustrates a cut aerosol generating article 10 that has been cut along line 15 to expose internal components of the aerosol generating article 10, including the susceptor heating element 25. The susceptor hating element 25 may be removed from the aerosol generating article using a heating element removal tool 700 that has a magnetic tip 710. When the magnetic tip 710 is placed in proximity to the susceptor heating element 25 the susceptor heating element 25 is attracted to the tip 710 and may be removed from the aerosol generating article 10 as illustrated in FIG. 6.

Alternatively, the cutting element (for example, blade 430 as illustrated in FIG. 4) may comprise a magnet that attracts the susceptor heating element as the aerosol generating article is passed through the passageway of the cutting tool, and the cutting element and attracted susceptor heating element may be removed from the cutting tool to recover the susceptor heating element (not shown).

Figure 7:
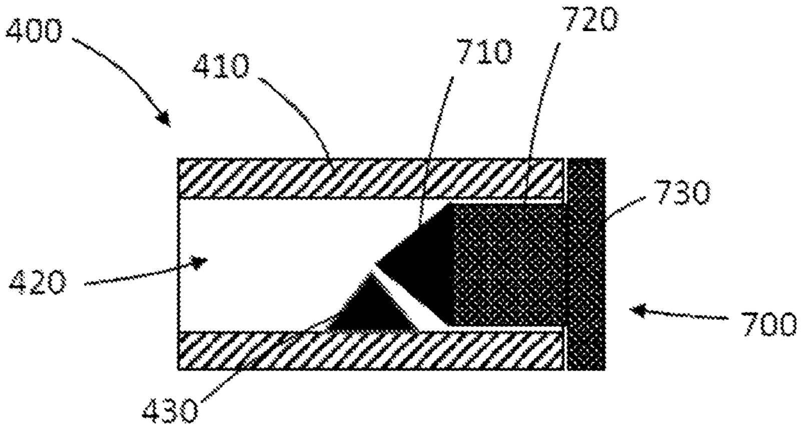
FIG. 7 is a cross-sectional illustration of a cutting tool and a heating element removal tool inserted into a passageway of the cutting tool.

FIG. 7 illustrates a heating element removal tool 700 inserted into the passageway 420 of the cutting tool 400 for storage. The tip 710 of the heating element removal tool 700 is magnetic and attracted to the blade 430, which magnetic attraction retains the heating element removal tool 700 in the passageway of the cutting tool 400. The heating element removal tool 700 includes a shaft 720 that extends from a distal handle portion 730 to the magnetic tip 710. The distal handle portion 730 has a diameter greater than the diameter of the passageway 420 but is substantially the same as the outer diameter of the body 410 of the cutting tool 400 to provide a smooth transition between the exterior surfaces of the cutting tool 400 and the heating element removal tool 700 when the heating element removal tool 700 is stored in the passageway 420 of the cutting tool 400.

Figure 8:
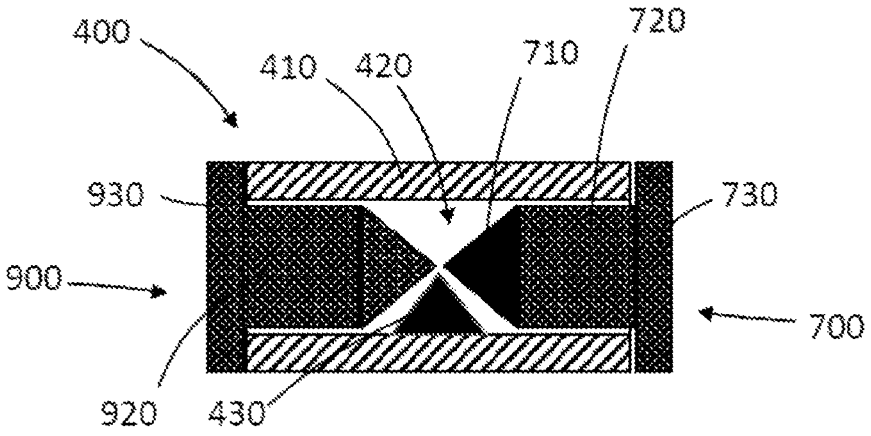
FIG. 8 is a cross-sectional illustration of a cutting tool, a heating element removal tool inserted into a passageway of the cutting tool, and a separator tool inserted into the passageway of the cutting tool.

As illustrated in FIG. 8, a separator tool 900 may also be inserted in, and retained within, the passageway 420 of the cutting tool 400. A tip of the separator tool 900 may be magnetic and attracted to the blade 430 or may be magnetically attracted to the tip 710 of the heating element removal tool 700. The magnetic attraction retains the separator tool 900 in the passageway of the cutting tool 400. The separator tool 900 includes a shaft 920 that extends from a distal handle portion 930 to the tip. The distal handle portion 930 has a diameter greater than the diameter of the passageway 420 but is substantially the same as the outer diameter of the body 410 of the cutting tool 400 to provide a smooth transition between the exterior surfaces of the cutting tool 400 and the separator tool 900 when the separator removal tool 900 is stored in the passageway 420 of the cutting tool 400.

Figure 9:
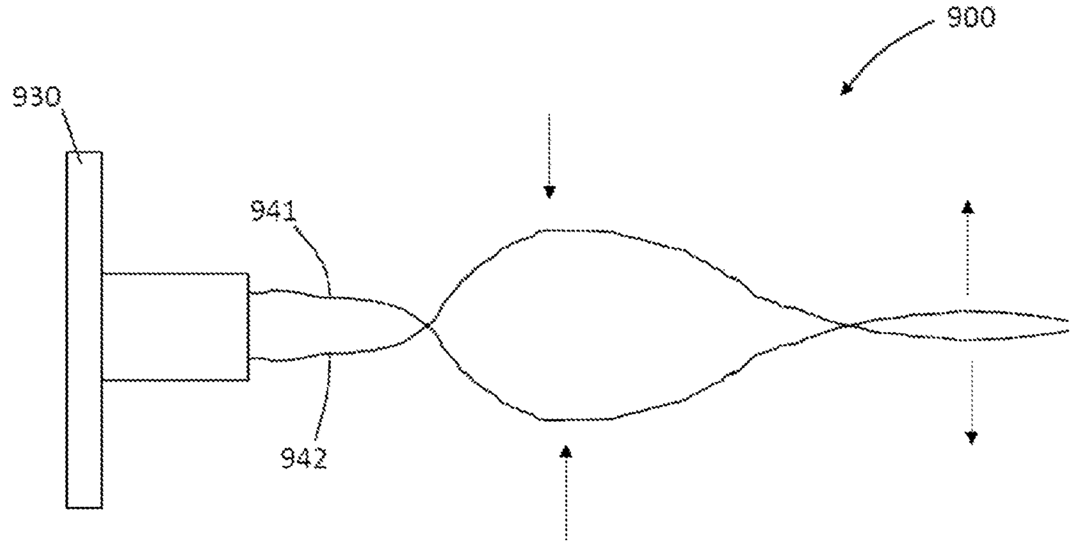
FIG. 9 is a schematic illustration of an example of a separating tool.

A schematic drawing of an example of a separator tool 900 is shown in FIG. 9. The separator tool 900 includes a handle 930 and a first arm 941 and a second arm 942 extending from the handle 930. Inward pinching force on the mid-section of the arms 941, 942 causes free ends of the arms 941, 942 to separate. The free ends of the arms 941, 942 serve as a spreader. Insertion of the free ends of the arms 941, 942 of the separator tool 900 into a cut (such as cut depicted in FIG. 5) of an aerosol generating article and pinching the mid-section of the arms 941, 942 causes the free ends of the separator tool 900 to separate, which causes opposing surfaces along the cut aerosol generating article to separate. Separating opposing surfaces of the aerosol generating article along the cut may provide access to the susceptor heating element, which may be removed from the aerosol generating article using the heating element removal tool.

Figure 10:
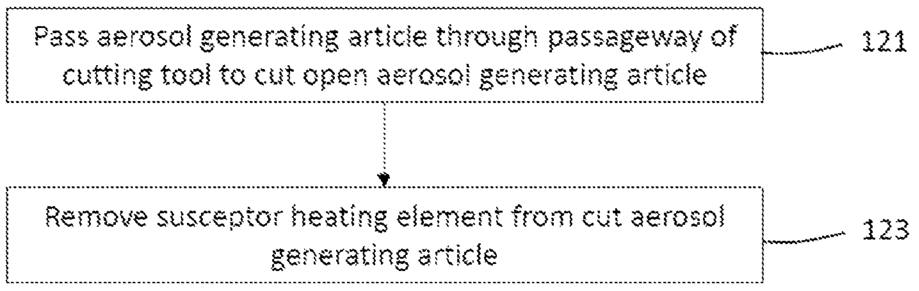
FIG. 10 is a flow diagram illustrating an embodiment of a method according to the present invention.

FIG. 10 is a flow diagram illustrating an example of a method according to the present invention. The method includes passing the aerosol generating article through a passageway of a cutting tool to cut the aerosol generating article (121). The method also includes removing the susceptor heating element from the cut aerosol generating article (123).

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A ±2 percent of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. An assembly to facilitate removal of a susceptor heating element from an aerosol generating article, the assembly comprising:

a cutting tool comprising (i) a body defining a passageway through which the aerosol generating article may be passed, and (ii) a cutting element extending into the passageway, wherein the cutting element comprises a cutting edge arranged to cut the aerosol generating article as the aerosol generating article passes through the passageway; and a heating element removal tool comprising a tip configured to magnetically attract the susceptor heating element and to remove the heating element from the aerosol generating element that has been cut by the cutting tool when the tip is placed in proximity to the susceptor heating element.

2. The assembly according to claim 1, wherein the cutting element comprises a first blade.

3. The assembly according to claim 1, wherein the heating element removal tool is retainable in the passageway.

4. The assembly according to claim 3, wherein the heating element removal tool is magnetically retainable in the passageway.

5. The assembly according to claim 4, wherein the tip of the heating element removal tool is magnetically attracted to the cutting element to magnetically retain the heating element removal tool in the passageway.

6. The assembly according to claim 1, comprising a separator tool configured to aid in separating a portion of the cut aerosol generating article from an opposing portion of the cut aerosol generating article along the cut.

7. The assembly according to claim 6, wherein the separator tool is retainable in the passageway.

8. A tool to facilitate removal of a susceptor heating element from an aerosol generating article, the tool comprising:

a body defining a passageway through which the aerosol generating article may be passed; and a cutting element extending into the passageway, wherein the cutting element comprises a cutting edge arranged to cut the aerosol generating article as the aerosol generating article passes through the passageway, and wherein the cutting element comprises a magnet and is configured to magnetically attract the susceptor heating element.

9. The tool according to claim 8, wherein the cutting element comprises a blade.

10. The tool according to claim 8, wherein the cutting element is configured to be inserted into the passageway and removed from the passageway.

11. A method comprising:

removing a susceptor heating element from an aerosol generating article using the tool of claim 8.

12. A method for removing a susceptor heating element from an aerosol generating article, the method comprising:

passing the aerosol generating article through a passageway of a cutting tool, the cutting tool comprising (i) a body defining the passageway and (ii) a cutting element extending into the passageway, the cutting element comprising a cutting edge arranged to cut the aerosol generating article as the aerosol generating article is passed through the passageway; and removing the susceptor heating element from the cut aerosol generating article, wherein removing the susceptor heating element from the cut aerosol generating article comprises magnetically attracting the susceptor heating element to the cutting tool or magnetically attracting the susceptor heating element to a tip of a heating element removal tool.

13. The method according to claim 12, further comprising separating a portion of the cut aerosol generating article from an opposing portion of the cut aerosol generating article along the cut.

14. The method according to claim 12, wherein removing the susceptor heating element from the cut aerosol generating article comprises magnetically attracting the susceptor heating element to the cutting element.

* * * * *